(12) United States Patent
Yoshida et al.

(10) Patent No.: US 11,225,060 B2
(45) Date of Patent: Jan. 18, 2022

(54) LAMINATED GLASS

(71) Applicant: SEKISUI CHEMICAL CO., LTD., Osaka (JP)

(72) Inventors: Shougo Yoshida, Kouka (JP); Manabu Matsumoto, Kouka (JP); Kazuhiko Nakayama, Kouka (JP); Jun Sasaki, Kouka (JP); Moyuru Okano, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 88 days.

(21) Appl. No.: 16/606,724

(22) PCT Filed: Mar. 30, 2018

(86) PCT No.: PCT/JP2018/014009
§ 371 (c)(1),
(2) Date: Oct. 18, 2019

(87) PCT Pub. No.: WO2018/198678
PCT Pub. Date: Nov. 1, 2018

(65) Prior Publication Data
US 2020/0147937 A1 May 14, 2020

(30) Foreign Application Priority Data

Apr. 28, 2017 (JP) .............................. JP2017-090386

(51) Int. Cl.
*B32B 17/10* (2006.01)
*B32B 7/04* (2019.01)
(Continued)

(52) U.S. Cl.
CPC .......... *B32B 17/10761* (2013.01); *B32B 7/04* (2013.01); *B32B 17/10568* (2013.01);
(Continued)

(58) Field of Classification Search
None
See application file for complete search history.

(56) References Cited

U.S. PATENT DOCUMENTS

2004/0234778 A1  11/2004  Fukatani et al.
2010/0227135 A1   9/2010  Takagi et al.
(Continued)

FOREIGN PATENT DOCUMENTS

CN   103080035 A   5/2013
CN   105939979 A   9/2016
(Continued)

OTHER PUBLICATIONS

International Preliminary Report on Patentability (PCT/IPEA/409) for Application No. PCT/JP2018/014009 dated Feb. 27, 2019 (English Translation mailed Oct. 31, 2019).
(Continued)

*Primary Examiner* — Ramsey Zacharia
(74) *Attorney, Agent, or Firm* — Cheng Law Group, PLLC

(57) ABSTRACT

Provided is laminated glass capable of preventing occurrence of discoloration in the interlayer film in an end part of laminated glass, and keeping the appearance of laminated glass excellent. Laminated glass according to the present invention is laminate glass including a first lamination glass member, a second lamination glass member, and an interlayer film containing a thermoplastic resin, in which no discoloration occurs in the interlayer film irradiated with light in an end part of the laminated glass after a light irradiation test: "the laminated glass is irradiated with xenon light at a black panel temperature of 83° C., a temperature inside the vessel of 50° C. and a humidity of 50% RH for 2000 hours", or discoloration occurs within a length of 1 mm or less inwardly from an end part of the interlayer film
(Continued)

irradiated with light in the end part of the laminated glass after the light irradiation test.

10 Claims, 1 Drawing Sheet

(51) Int. Cl.
    *B32B 27/20*     (2006.01)
    *B32B 27/30*     (2006.01)

(52) U.S. Cl.
    CPC ............ *B32B 27/20* (2013.01); *B32B 27/306* (2013.01); *B32B 2250/03* (2013.01); *B32B 2250/05* (2013.01); *B32B 2250/40* (2013.01); *B32B 2307/412* (2013.01); *B32B 2307/732* (2013.01); *B32B 2605/08* (2013.01)

(56) References Cited

U.S. PATENT DOCUMENTS

| | | |
|---|---|---|
| 2012/0052310 A1 | 3/2012 | Keller et al. |
| 2012/0094100 A1 | 4/2012 | Takagi et al. |
| 2014/0014178 A1 | 1/2014 | Muguruma |
| 2014/0017455 A1 | 1/2014 | Takagi et al. |
| 2016/0214352 A1 | 7/2016 | Yoshida et al. |
| 2016/0214354 A1 | 7/2016 | Yoshida et al. |
| 2017/0050415 A1 | 2/2017 | Kanki et al. |
| 2017/0072665 A1 | 3/2017 | Iwamoto et al. |
| 2017/0217132 A1 | 8/2017 | Iwamoto et al. |
| 2019/0344544 A1 | 11/2019 | Kanki et al. |
| 2020/0238662 A1 | 7/2020 | Kanki et al. |

FOREIGN PATENT DOCUMENTS

| | | |
|---|---|---|
| CN | 105980325 A | 9/2016 |
| EP | 1 419 999 A1 | 5/2004 |
| EP | 3 053 889 A1 | 8/2016 |
| EP | 3 604 247 A1 | 2/2020 |
| JP | 2003-327454 A | 11/2003 |
| JP | 2009-35444 A | 2/2009 |
| JP | 2012-519646 A | 8/2012 |
| JP | 2013-28486 A | 2/2013 |
| WO | WO-03/018502 A1 | 3/2003 |
| WO | WO-2015/046587 A1 | 4/2015 |
| WO | WO-2015/147302 A1 | 10/2015 |

OTHER PUBLICATIONS

Supplementary European Search Report for the Application No. EP 18 791 784.4 dated Dec. 17, 2020.
International Search Report for the Application No. PCT/JP2018/014009 dated May 22, 2018.

[FIG. 1]
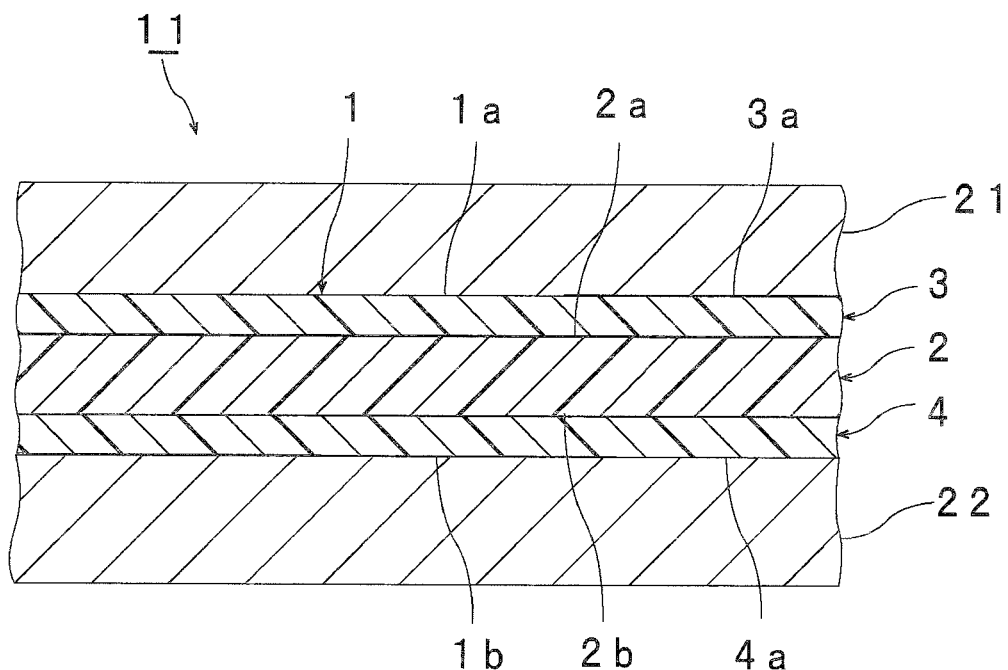
[FIG. 2]
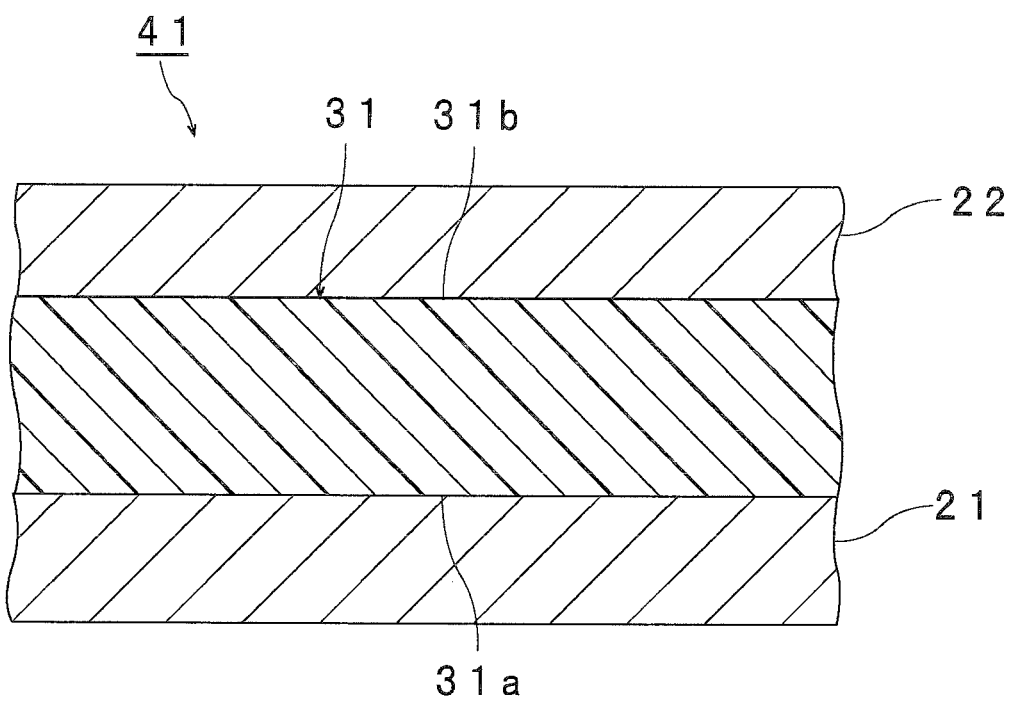

LAMINATED GLASS

TECHNICAL FIELD

The present invention relates to laminated glass having an interlayer film containing a thermoplastic resin.

BACKGROUND ART

Since laminated glass generates only a small amount of scattering glass fragments even when subjected to external impact and broken, the laminated glass is excellent in safety. As such, the laminated glass is widely used for automobiles, railway vehicles, aircraft, ships, buildings and the like. The laminated glass is produced by sandwiching an interlayer film between a pair of glass plates.

As one example of the laminated glass, the following Patent Document 1 discloses laminated glass having an interlayer film containing a polyvinyl acetal resin, an ultraviolet absorber, a plasticizer, an adhesive force regulator, and an oxidation inhibitor. The ultraviolet absorber used in the interlayer film is a malonic ester compound and/or an oxanilide compound.

The following Patent Document 2 discloses laminated glass having an interlayer film having low yellowing tendency, high transmittance to UV-A rays and visible light, and low transmittance to UV-B rays. The interlayer film contains a polyvinyl acetal, a plasticizer, and an oxanilide type compound which is an UV absorber.

RELATED ART DOCUMENT

Patent Document

Patent Document 1: JP 2003-327454 A
Patent Document 2: US 2012/0052310 A1

SUMMARY OF THE INVENTION

Problems to be Solved by the Invention

In conventional laminated glass, discoloration can occur in an interlayer film in an end part of the laminated glass. In particular, discoloration to yellow is easy to occur in an end part of laminated glass. This discoloration is likely to occur particularly when light, heat and the like is applied to the laminated glass.

When discoloration occurs in the interlayer film in an end part of the laminated glass, the appearance of the laminated glass is impaired. When the interlayer film is multi-layered, the discoloration is likely to be occurred due to the layer being in contact with the glass plate of the interlayer film.

While it is conceivable that the above problem is solved by increasing the adding amount of the ultraviolet absorber in a conventional interlayer film, laminated glass prepared with such an interlayer film can have reduced transparency.

An object of the present invention is to provide laminated glass capable of preventing occurrence of discoloration in the interlayer film in an end part of laminated glass, and keeping the appearance of laminated glass excellent.

Means for Solving the Problems

According to a broad aspect of the present invention, there is provided laminated glass including a first lamination glass member, a second lamination glass member, and an interlayer film containing a thermoplastic resin, the interlayer film being arranged between the first lamination glass member and the second lamination glass member, in which no discoloration occurs in the interlayer film irradiated with light in an end part of the laminated glass after a later-described light irradiation test, or discoloration occurs within a length of 1 mm or less inwardly from an end part of the interlayer film irradiated with light in the end part of the laminated glass after the later-described light irradiation test.

Light irradiation test: the obtained laminated glass is irradiated with xenon light at a black panel temperature of 83° C., a temperature inside the vessel of 50° C. and a humidity of 50% RH for 2000 hours. The irradiance at the time of irradiation with xenon light is 180 W/m$^2$, and the wavelength for measuring irradiance is 300 to 400 nm, and the inner filter is made of quartz, and the outer filter is made of quartz: #275 (cutoff 275 nm). When the first lamination glass member and the second lamination glass member have the same visible light transmittance, the xenon light is irradiated from the first lamination glass member side. When the first lamination glass member and the second lamination glass member are different in visible light transmittance, the xenon light is irradiated from the side of the lamination glass member having a higher visible light transmittance.

In a specific aspect of the laminated glass according to the present invention, the thermoplastic resin includes a polyvinyl acetal resin.

In a specific aspect of the laminated glass according to the present invention, a ratio of a content of the hydroxyl group of the polyvinyl acetal resin in a layer of the interlayer film being in contact with the lamination glass member at a position of 2 mm inwardly from an end part of the laminated glass after the light irradiation test, to a content of the hydroxyl group of the polyvinyl acetal resin in a layer of the interlayer film being in contact with the lamination glass member at a position of 70 mm inwardly from an end part of the laminated glass after the light irradiation test is 1.2 or less.

In a specific aspect of the laminated glass according to the present invention, a content of the hydroxyl group of the polyvinyl acetal resin in the layer of the interlayer film being in contact with the lamination glass member at a position of 2 mm inwardly from an end part of the laminated glass after the light irradiation test is 30% by mole or less.

In a specific aspect of the laminated glass according to the present invention, the polyvinyl acetal resin is polyvinyl butyral resin.

In a specific aspect of the laminated glass according to the present invention, there is a portion where a lateral surface of the interlayer film is exposed in an end part of the laminated glass.

In a specific aspect of the laminated glass according to the present invention, the interlayer film has a layer having a glass transition temperature of 10° C. or less and containing a thermoplastic resin, or a layer that is colored and contains a thermoplastic resin.

In a specific aspect of the laminated glass according to the present invention, the interlayer film includes a first layer containing a thermoplastic resin, and a second layer containing a thermoplastic resin, and the second layer is arranged on a first surface side of the first layer.

In a specific aspect of the laminated glass according to the present invention, the interlayer film includes a third layer containing a thermoplastic resin, and the third layer is arranged on a second surface side opposite to the first surface side of the first layer.

In a specific aspect of the laminated glass according to the present invention, the interlayer film has a visible light transmittance of 70% or more.

In a specific aspect of the laminated glass according to the present invention, the laminated glass is laminated glass that is to be used as glass for windshield in an automobile, and black coating is not applied on the contact surface between the interlayer film and a lamination glass member on an outer side of the automobile.

In a specific aspect of the laminated glass according to the present invention, the laminated glass is used as side glass, roof glass or glass for backlight in automobiles.

Effect of the Invention

Laminated glass according to the present invention includes a first lamination glass member, a second lamination glass member, and an interlayer film containing a thermoplastic resin, and the interlayer film is arranged between the first lamination glass member and the second lamination glass member. In the laminated glass according to the present invention, no discoloration occurs in the interlayer film irradiated with light in an end part of the laminated glass after the light irradiation test, or discoloration occurs within a length of 1 mm or less inwardly from an end part of the interlayer film irradiated with light in the end part of the laminated glass after the light irradiation test. Since the laminated glass according to the present invention has the above configuration, it is possible to prevent occurrence of discoloration in the interlayer film in an end part of the laminated glass according to the present invention, and it is possible to keep the appearance of the laminated glass excellent.

BRIEF DESCRIPTION OF DRAWINGS

FIG. 1 is a sectional view schematically showing laminated glass in accordance with a first embodiment of the present invention.

FIG. 2 is a sectional view schematically showing laminated glass in accordance with a second embodiment of the present invention.

MODE(S) FOR CARRYING OUT THE INVENTION

Hereinafter, the present invention will be described in detail.

Laminated glass according to the present invention includes a first lamination glass member, second lamination glass member and an interlayer film. The interlayer film is arranged between the first lamination glass member and the second lamination glass member. In the laminated glass according to the present invention, the interlayer film contains a thermoplastic resin.

In the laminated glass according to the present invention, when the later-described light irradiation test is conducted, no discoloration occurs in the interlayer film irradiated with light in an end part of the laminated glass, or discoloration occurs within a length of 1 mm or less inwardly from an end part of the interlayer film irradiated with light in the end part of the laminated glass. In the present invention, it is preferred that no discoloration occurs in an end part of the interlayer film in the later-described light irradiation test. In the present invention, discoloration may occur in the interlayer film in the later-described light irradiation test. In the present invention, when discoloration occurs in an end part of the interlayer film, the length in which the discoloration occurs is small.

Light irradiation test: the obtained laminated glass is irradiated with xenon light at a black panel temperature of 83° C., a temperature inside the vessel of 50° C. and a humidity of 50% RH for 2000 hours. The irradiance at the time of irradiation with xenon light is 180 W/m$^2$, and the wavelength for measuring irradiance is 300 to 400 nm, and the inner filter is made of quartz, and the outer filter is made of quartz: #275 (cutoff 275 nm). When the first lamination glass member and the second lamination glass member have the same visible light transmittance, the xenon light is irradiated from the first lamination glass member side. When the first lamination glass member and the second lamination glass member are different in visible light transmittance, the xenon light is irradiated from the side of the lamination glass member having a higher visible light transmittance.

In the present invention, since the above configuration is provided, it is possible to prevent occurrence of discoloration in the interlayer film in an end part of laminated glass, and it is possible to keep the appearance of laminated glass excellent. In the present invention, it is possible to suppress deterioration in transparency of laminated glass.

The length in which discoloration occurs means the shortest length (linear length) from the innermost position in the interlayer film in the part where discoloration occurs, to an end part of the interlayer film between the first lamination glass member and the second lamination glass member. The length in which discoloration occurs indicates the depth in which discoloration occurs in the interlayer film. When discoloration occurs in a plurality of sites, the shortest length is measured for each of the plurality of discoloration sites, and the maximum value of the shortest length is regarded as a length in which discoloration occurs.

The term "end part of laminated glass" means an end part of laminated glass in the part where the first lamination glass member, the interlayer film and the second lamination glass member are layered. When there is a portion of the interlayer film that protrudes laterally from the part where the first lamination glass member, the interlayer film, and the second lamination glass member are layered, the inner side of the protruding portion of the interlayer film is the end part of the laminated glass. When a covering portion that covers the interlayer film is formed laterally of the part where the first lamination glass member, the interlayer film, and the second lamination glass member are layered, the inner side of the covering portion is the end part of the laminated glass.

A content of the hydroxyl group of the polyvinyl acetal resin in the layer of the interlayer film being in contact with the lamination glass member of the interlayer film at a position of 2 mm inwardly from an end part of the laminated glass after the light irradiation test is referred to as a content of the hydroxyl group at position of 2 mm. A content of the hydroxyl group of the polyvinyl acetal resin in the layer of the interlayer film being in contact with the lamination glass member at a position of 70 mm inwardly from an end part of the laminated glass after the light irradiation test is referred to as a content of the hydroxyl group at position of 70 mm. A ratio of a content of the hydroxyl group at a position of 2 mm to a content of the hydroxyl group at a position of 70 mm (content of hydroxyl group at position of 2 mm/content of hydroxyl group at position of 70 mm) is preferably 1.2 or less, more preferably 1.15 or less, further preferably 1.1 or less. When the above ratio (content of hydroxyl group at position of 2 mm/content of hydroxyl group at position of 70 mm) is satisfied, it is possible to effectively prevent occurrence of discoloration in an end part of the laminated glass, and keep the appearance of the laminated glass excellent.

When the interlayer film has a one-layer (first layer) structure, the layer being in contact with the laminated glass is the interlayer film (first layer). When the interlayer film has a two-layer structure including a first layer and a second layer, the layer being in contact with the laminated glass is the first layer and the second layer, namely, the first layer being in contact with the first lamination glass member and the second layer being in contact with the second lamination glass member. When the interlayer film has a three-layer structure including a second layer, a first layer and a third layer, the layer being in contact with the laminated glass is the second layer and the third layer, namely, the second layer being in contact with the first lamination glass member and the third layer being in contact with the second lamination glass member.

From the viewpoint of effectively preventing occurrence of discoloration in an end part of the laminated glass, and keeping the appearance of the laminated glass excellent, a content of the hydroxyl group of the polyvinyl acetal resin in the layer of the interlayer film being in contact with the lamination glass member at a position of 2 mm inwardly from an end part of the laminated glass after the light irradiation test is preferably 30% by mole or less.

In measuring the content of the hydroxyl group of the interlayer film at a position of 2 mm inwardly from an end part of the laminated glass, a strip of 1 mm wide centered on a line at 2 mm inwardly from an end part of the laminated glass is used. In measuring the content of the hydroxyl group of the interlayer film at a position of 70 mm inwardly from an end part of the laminated glass, a strip of 1 mm wide centered on a line at 70 mm inwardly from an end part of the laminated glass is used.

In an end part of the laminated glass, there may be a portion in which the lateral surface of the interlayer film is exposed. Even when the lateral surface of the interlayer film is exposed, it is possible to prevent occurrence of discoloration in an end part of laminated glass, and it is possible to keep the appearance of laminated glass excellent in the present invention. In an end part of the laminated glass, there may be a portion in which the lateral surface of the interlayer film is not exposed.

It is preferred that the interlayer film have a layer having a glass transition temperature of 10° C. or less and containing a thermoplastic resin, or a layer that is colored and contains a thermoplastic resin, and it is more preferred that the interlayer film have a layer having a glass transition temperature of 10° C. or less and containing a thermoplastic resin. Although discoloration tends to be easy to occur in these layers, it is possible to make discoloration difficult to occur, prevent occurrence of discoloration in an end part of the laminated glass, and keep the appearance of the laminated glass excellent by satisfying the configuration of the present invention, for example, by selection of a thermoplastic resin or control of the condition of the end part of the interlayer film.

The glass transition temperature is measured in the following manner.

The interlayer film obtained is stored for 1 month or more at a temperature of 23° C. and a humidity of 30%, after which, when the interlayer film is a multi-layered interlayer film, each of the first layer and the third layer is peeled off to be isolated and press-molded with a press molding machine to obtain an object to be measured. With regard to the object to be measured, the measurement is performed using the "ARES-G2" available from TA Instruments Japan Inc. In this connection, when the interlayer film is a single-layered interlayer film, the interlayer film is cut so as to have a diameter of 8 mm to be measured. A parallel plate with a diameter of 8 mm is used as a jig, and the measurement is performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

The colored layer contains, for example, a coloring agent. The visible light transmittance of the colored layer is, for example, 80% or less, and may be less than 70%.

From the viewpoint of enhancing the transparency of the laminated glass, the visible light transmittance of the interlayer film is preferably 70% or more, more preferably 80% or more, further preferably 90% or more.

The visible light transmittance is measured at a wavelength ranging from 380 to 780 nm by using a spectrophotometer ("U-4100" available from Hitachi High-Tech Science Corporation) in conformity with JIS R3211:1998. The visible light transmittance of the interlayer film may be measured while the interlayer film is arranged between two sheets of clear glass.

Hereinafter, specific embodiments of the present invention will be described with reference to the drawings.

FIG. 1 is a sectional view schematically showing laminated glass in accordance with a first embodiment of the present invention.

A laminated glass 11 shown in FIG. 1 includes a first lamination glass member 21, a second lamination glass member 22 and an interlayer film 1. The interlayer film 1 is arranged between the first lamination glass member 21 and the second lamination glass member 22, to be sandwiched therebetween.

The first lamination glass member 21 is layered on a first surface 1a of the interlayer film 1. The second lamination glass member 22 is layered on a second surface 1b opposite to the first surface 1a of the interlayer film 1. The first lamination glass member 21 is layered on an outer surface 3a of a second layer 3 of the interlayer film 1. The second lamination glass member 22 is layered on an outer surface 4a of the third layer 4 of the interlayer film 1.

The interlayer film 1 is a multi-layered interlayer film having a two or more-layer structure. The interlayer film 1 includes a first layer 2, the second layer 3 arranged on a first surface 2a side of the first layer 2, and a third layer 4 arranged on a second surface 2b side opposite to the first surface 2a of the first layer 2. The second layer 3 is layered on the first surface 2a of the first layer 2. The third layer 4 is layered on the second surface 2b of the first layer 2. The first layer 2 is an intermediate layer. Each of the second layer 3 and the third layer 4 is, for example, a protective layer and is a surface layer in the present embodiment. The first layer 2 is arranged between the second layer 3 and the third layer 4 to be sandwiched therebetween. Accordingly, the interlayer film 1 has a multilayer structure in which the second layer 3, the first layer 2, and the third layer 4 are arranged in this order. In the interlayer film 1, the second layer 3, the first layer 2, and the third layer 4 are arranged and layered in this order.

It is preferred that the outer surface 3a on the opposite side of the first layer 2 side of the second layer 3 be a surface on which a lamination glass member is laminated. It is preferred that the outer surface 4a on the opposite side of the first layer 2 side of the third layer 4 be a surface on which a lamination glass member is laminated.

In this connection, other layers may be arranged between the first layer 2 and the second layer 3 and between the first layer 2 and the third layer 4, respectively. It is preferred that the first layer 2 and the second layer 3, and the first layer 2 and the third layer 4 be directly layered. Examples of the other layer include layers containing a thermoplastic resin such as a polyvinyl acetal resin, and layers containing, for example, polyethylene terephthalate.

The interlayer film 1 contains a thermoplastic resin. The first layer 2 contains a thermoplastic resin. The second layer 3 contains a thermoplastic resin. The third layer 4 contains a thermoplastic resin.

FIG. 2 is a sectional view schematically showing laminated glass in accordance with a second embodiment of the present invention.

Laminated glass 41 shown in FIG. 2 includes the first lamination glass member 21, the second lamination glass member 22 and an interlayer film 31. The interlayer film 31 is arranged between the first lamination glass member 21 and the second lamination glass member 22, to be sandwiched therebetween. The first lamination glass member 21 is layered on a first surface 31a of the interlayer film 31. The second lamination glass member 22 is layered on a second surface 31b opposite to the first surface 31a of the interlayer film 31.

The interlayer film 31 is a single-layered interlayer film having a one-layer structure. The interlayer film 31 is a first layer. The interlayer film 31 contains a thermoplastic resin.

The interlayer film has a one-layer structure or a two or more-layer structure. The interlayer film may have a one-layer structure and may have a two or more-layer structure. The interlayer film may have a two-layer structure and may have a three or more-layer structure. The interlayer may be an interlayer film having a one-layer structure including only a first layer (single-layered interlayer film) and may be an interlayer film having two or more-layer structure including a first layer and other layer (multi-layered interlayer film).

Hereinafter, the details of the first layer (including a single-layered interlayer film), the second layer, and the third layer which constitute the interlayer film, and the details of each ingredient contained in the first layer, the second layer, and the third layer will be described.

(Thermoplastic Resin)

The interlayer film contains a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and a cycloolefin resin. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

From the viewpoint of effectively preventing occurrence of discoloration in an end part of laminated glass, and keeping the appearance of laminated glass excellent, it is preferred that the interlayer film contain a polyvinyl butyral resin or an ionomer resin. From the viewpoint of effectively preventing occurrence of discoloration in an end part of laminated glass, and keeping the appearance of laminated glass excellent, it is preferred that the polyvinyl acetal resin be a polyvinyl butyral resin. From the viewpoint of effectively preventing occurrence of discoloration in an end part of laminated glass, and keeping the appearance of laminated glass excellent, it is preferred that the ionomer resin be a polyvinyl acetal ionomer resin.

The polyvinyl acetal ionomer resin is an ionomerized polyvinyl acetal resin. It is preferred that the polyvinyl acetal ionomer resin contain polyvinyl acetal into which an acid group is introduced.

The polyvinyl acetal ionomer resin has, for example, a —$CH_2$—CH— group in a main chain. The polyvinyl acetal ionomer resin has a polyvinyl acetal skeleton. The polyvinyl acetal skeleton has a —$CH_2$—CH— group in a main chain. To the carbon atom in the "—CH—" moiety in a —$CH_2$—CH— group, another group is bound. In the polyvinyl acetal ionomer resin, it is preferred that —$CH_2$—CH— groups be consecutive in the main chain.

For neutralization in obtaining the polyvinyl acetal ionomer resin, metal is used. From the viewpoint of effectively enhancing the shock resistance at low temperature and the self-repairability, the metal is preferably Na, Li, K, Mg, Zn, Cu, Co, Al, Fe, Ni, Cr or Mn. It is preferred that the metal contain, in particular, Na.

Examples of the method for producing the polyvinyl acetal ionomer resin include the following method. Method of copolymerizing polyvinyl acetate and a monomer having a group capable of becoming an ionic functional group, saponifying, and acetalizing with aldehyde, followed by ionomerization. Method of acetalizing polyvinyl alcohol (PVA) with an aldehyde having a group capable of becoming an ionic functional group, followed by ionomerization. Method of acetalizing polyvinyl acetal with an aldehyde having a group capable of becoming an ionic functional group, followed by ionomerization.

Examples of the method for ionomerization include a method of adding a metal-containing compound into a solution, and a method of adding a metal-containing compound during kneading. The metal-containing compound may be added in a state of a solution.

It is preferred that the ionic functional group be a carboxyl group, a base of carboxyl group, a sulfonic acid group, a base of sulfonic acid group, a sulfinic acid group, a base of sulfinic acid group, a sulfenic acid group, a base of sulfenic acid group, a phosphoric acid group, a base of phosphoric acid group, a phosphonic acid group, a base of phosphonic acid group, an amino group, or a base of amino group. Regarding these groups, the effect of ionomerization effectively appears, and the effect of the present invention effectively appears.

The content of the ionic functional group means a sum of a percentage of the group that can become an ionic functional group in the resin, and a percentage of the ionic functional group constituting the metal salt of the ionic functional group. The content of the ionic functional group can be determined by using NMR or the like. For example, the content of the ionic functional group can be calculated from an integrated value of the peak originated from the ionic functional group (appearing around 45 ppm in the carboxyl group) and the peak originated from the main chain appearing around 30 ppm in carbon NMR.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

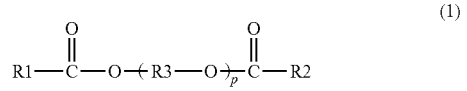

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of enhancing the sound insulating properties of laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance (heat shielding compound). It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, and is preferably 0.1 µm or less, more preferably 0.05 µm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), each content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, or a third layer), each content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-tert-butyl-6-methylphenyl)ethyl ester phosphate, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Light Stabilizer)

It is preferred that the interlayer film contain a light stabilizer. It is preferred that the first layer contain a light stabilizer. It is preferred that the second layer contain a light stabilizer. It is preferred that the third layer contain a light stabilizer. By using the light stabilizer, discoloration is further suppressed and the visible light transmittance is less likely to lower even when the interlayer film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom of the piperidine structure. From the viewpoint of further suppressing the discoloration, a hindered amine light stabilizer in which an alkyl group or an alkoxy group is bonded to a nitrogen atom of the piperidine structure is preferred. The hindered amine light stabilizer is preferably a hindered amine light stabilizer in which an alkyl group is bonded to a nitrogen atom of the piperidine structure, and also preferably a hindered amine light stabilizer in which an alkoxy group is bonded to a nitrogen atom of the piperidine structure.

As the hindered amine light stabilizer in which an alkyl group is bonded to a nitrogen atom of the piperidine structure, "Tinuvin765" and "Tinuvin622SF" available from BASF, and "ADK STAB LA-52" available from ADEKA, or the like can be recited.

As the hindered amine light stabilizer in which an alkoxy group is bonded to a nitrogen atom of the piperidine structure, "TinuvinXT-850FF" and "TinuvinXT-855FF" available from BASF, and "ADK STAB LA-81" available from ADEKA, or the like can be recited.

As the hindered amine light stabilizer in which a hydrogen atom is bonded to a nitrogen atom of the piperidine structure, "Tinuvin 770DF" available from BASF, and "Hostavin N24" available from Clariant, or the like can be recited.

From the viewpoint of further suppressing the discoloration, the light stabilizer has a molecular weight of preferably 2000 or less, more preferably 1000 or less, further preferably 700 or less.

In 100% by weight of the interlayer film or in 100% by weight of a layer containing the light stabilizer (a first layer, a second layer, or a third layer), the content of the light stabilizer is preferably 0.0025% by weight or more, more preferably 0.025% by weight or more, and is preferably 0.5% by weight or less, more preferably 0.3% by weight or less. When the content of the light stabilizer is the above lower limit or more and the above upper limit or less, discoloration is efficiently suppressed.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the lengthwise direction of the interlayer film. When the interlayer film has a square planar shape, the distance between one end and the other end is a distance between one end and the other end that are opposed to each other.

From the viewpoint of further improving the sound insulating properties of laminated glass when the interlayer film has a two or more-layer structure or a three or more-layer structure, the glass transition temperature of the first layer is preferably 30° C. or less, more preferably 20° C. or less, further preferably 10° C. or less. The glass transition temperature of the first layer is preferably −15° C. or more.

The thickness of the interlayer film is not particularly limited. From the viewpoint of the practical aspect and the viewpoint of sufficiently enhancing the heat shielding property, the thickness of the interlayer film is preferably 0.1 mm or more, and more preferably 0.25 mm or more and is preferably 3 mm or less, and more preferably 1.5 mm or less. When the thickness of the interlayer film is the above-described lower limit or more, the penetration resistance of laminated glass is enhanced. When the thickness of the interlayer film is the above upper limit or less, the transparency of the interlayer film is further improved.

The thickness of the interlayer film is designated as T. From the viewpoint of making discoloration more difficult to occur in an end part of laminated glass, and further suppressing deterioration in transparency of laminated glass in the case of a multi-layered interlayer film, the thickness of the first layer is preferably 0.0625 T or more, more preferably 0.1 T or more, and is preferably 0.375 T or less, and more preferably 0.25 T or less.

From the viewpoint of making discoloration more difficult to occur in an end part of laminated glass, and further suppressing deterioration in transparency of laminated glass, the thickness of the second layer is preferably 0.625 T or more, more preferably 0.75 T or more, and is preferably 0.9375 T or less, and more preferably 0.9 T or less. When the thickness of the second layer is the above-described lower limit or more and the above-described upper limit or less, bleeding out of the plasticizer can be suppressed.

From the viewpoint of making discoloration more difficult to occur in an end part of laminated glass, a total thickness of the second layer and the third layer is preferably 0.625 T or more, more preferably 0.75 T or more, and is preferably 0.9375 T or less, and more preferably 0.9 T or less when the interlayer film includes the second layer and the third layer. When the total thickness of the second layer and the third layer is the above-described lower limit or more and the above-described upper limit or less, bleeding out of the plasticizer can be suppressed.

The interlayer film may be an interlayer film having a uniform thickness, or may be an interlayer film having varying thickness. The sectional shape of the interlayer film may be a rectangular shape and may be a wedge-like shape.

The method for producing the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then layering the respective obtained layers, a method of coextruding respective resin compositions used for constituting respective layers with an extruder and layering the respective layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have a concave-convex shape in at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the concave-convex shape, which is a quantitatively constant concave-convex pattern, can be formed.

(Other Details of Laminated Glass)

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film and at least one of the first lamination glass member and the second lamination glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, and is preferably 5 mm or less, more preferably 3 mm or less. Moreover, when the lamination glass member is a glass plate, the thickness of the glass plate is preferably 1 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is used for obtaining laminated glass of an automobile.

In the present invention, since it is possible to prevent occurrence of discoloration in an end part of laminated glass, and it is possible to keep the appearance of laminated glass excellent, the laminated glass is used as side glass in automobiles, roof glass or glass for backlight in an automobile. The side glass is easy to visually recognize. The quality of the roof glass is easily altered by the sunlight or the like. Regarding the glass for backlight, a defect in appearance is easily recognized by backlight. By using the laminated glass according to the present invention as side glass, roof glass or glass for backlight, it is possible to achieve excellent appearance and suppress the alternation in quality. The laminated glass is laminated glass that is to be used as glass for windshield in an automobile, and it is preferred that black coating be not applied on a contact surface between the interlayer film and a lamination glass member on an outer side of the automobile.

Hereinafter, the present invention will be described in more detail with reference to examples and comparative examples. The present invention is not limited only to these examples.

With regard to the polyvinyl butyral resin (PVB) used in the following examples and comparative examples, the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Polyvinyl Acetal Resin (1))

Polyvinyl butyral resin having a butyralization degree of 68% by mole, an acetylation degree of 1% by mole, a content of the hydroxyl group of 31% by mole, and a weight average molecular weight of 150,000

(Polyvinyl Acetal Resin (X))

Polyvinyl butyral resin having a butyralization degree of 68% by mole, an acetylation degree of 1%, a content of the hydroxyl group of 31% by mole, and a weight average molecular weight of 68,000

Comparative Example 1

Preparation of Composition for Forming Interlayer Film:

The following ingredients were mixed, and kneaded sufficiently with a mixing roll to obtain a composition for forming an interlayer film.

100 parts by weight of Polyvinyl acetal resin (1)

40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Preparation of Interlayer Film:

By extruding a composition for forming an interlayer film with an extruder, a single-layered interlayer film (thickness: 800 μm) was prepared.

Preparation of Laminated Glass:

The obtained interlayer film was cut out into a piece of 8 cm long×8 cm wide. Then the interlayer film was sandwiched between two sheets of clear glass (8 cm long×8 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Example 1

Example of Interlayer Film in which End Part is Impregnated with Alkali Liquid:

An alkali liquid containing an alkali component in a mixture of isopropanol and methanol was prepared.

An end part of the laminated glass obtained in Comparative Example 1 was dipped in the alkali liquid, and the end part of the interlayer film was impregnated with the alkali liquid, and thus laminated glass was obtained.

Example 2

Example of Interlayer Film in which End Part is Subjected to Silica Sputtering:

End parts of the laminated glass of Comparative Example 1 were subjected to silica sputtering to obtain laminated glass.

Example 3

Example of Interlayer Film in which End Part is Subjected to Metal Sputtering:

End parts of the laminated glass of Comparative Example 1 were subjected to metal sputtering to obtain laminated glass.

Example 4

Example of Interlayer Film in which Polyvinyl Acetal Resin Sheet is Used in End Part:

A polyvinyl acetal resin sheet was pasted to an end part of the laminated glass of Comparative Example 1 to obtain laminated glass.

Example 5

Example of Interlayer Film in which Light Stabilizer-Containing Sheet is Used in End Part:

A light stabilizer-containing sheet (light stabilizer ("Tinuvin765" available from BASF) was pasted to an end part of the laminated glass of Comparative Example 1 to obtain laminated glass.

Example 6

Example of Interlayer Film in which End Part is Impregnated with Light Stabilizer:

End parts of the laminated glass of Comparative Example 1 were impregnated with a light stabilizer: "Tinuvin765" available from BASF to obtain laminated glass.

Example 7

Example of Interlayer Film in which Sealing Sheet is Used in End Part:

A sealing sheet was pasted to an end part of the laminated glass of Comparative Example 1 to obtain laminated glass. The sealing sheet has high airtightness. The sealing sheet prevents, for example, leakage of an oxidation inhibitor.

Comparative Example 2

Preparation of Composition for Forming First Layer:

The following ingredients were mixed, and kneaded sufficiently with a mixing roll to obtain a composition for forming a first layer.

100 parts by weight of Polyvinyl acetal resin (X)

60 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Preparation of Composition for Forming Second Layer and Third Layer:

The following ingredients were mixed, and kneaded sufficiently with a mixing roll to obtain a composition for forming a composition for forming a second layer and a third layer.

100 parts by weight of Polyvinyl acetal resin (1)

40 parts by weight of triethylene glycol di-2-ethylhexanoate (3GO) which is a plasticizer An amount that is 0.2 parts by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Preparation of Interlayer Film:

The composition for forming the first layer, and the composition for forming the second layer and the third layer were coextruded by using a co-extruder. An interlayer film (760 μm thick) having a laminate structure of the second layer (330 μm thick)/the first layer (100 μm thick)/the third layer (330 μm thick) was prepared.

Preparation of Laminated Glass:

The obtained interlayer film was cut out into a piece of 8 cm long×8 cm wide. Then the interlayer film was sandwiched between two sheets of clear glass (8 cm long×8 cm wide×2.5 mm thick), and vacuum-pressed by retention at 90° C. for 30 minutes with a vacuum laminator, to obtain a laminate. In the laminate, the part of the interlayer film protruding from the clear glass was cut off, to obtain laminated glass.

Example 8

Example of Interlayer Film in which End Part is Impregnated with Alkali Liquid:

An alkali liquid containing an alkali component in a mixture of isopropanol and methanol was prepared.

An end part of the laminated glass obtained in Comparative Example 2 was dipped in the alkali liquid, and the end part of the interlayer film was impregnated with the alkali liquid, and thus laminated glass was obtained.

Example 9

Example of Interlayer Film in which End Part is Subjected to Silica Sputtering:

An end part of the laminated glass of Comparative Example 2 was subjected to silica sputtering to obtain laminated glass.

Example 10

Example of Interlayer Film in which End Part is Subjected to Metal Sputtering:

An end part of the laminated glass of Comparative Example 2 was subjected to metal sputtering to obtain laminated glass.

Example 11

Example of Interlayer Film in which a Polyvinyl Acetal Resin Sheet is Used in End Part:

A polyvinyl acetal resin sheet was pasted to an end part of the laminated glass of Comparative Example 2 to obtain laminated glass.

Example 12

Example of Interlayer Film in which Light Stabilizer-Containing Sheet is Used in End Part:

A light stabilizer-containing sheet (light stabilizer: "Tinuvin765" available from BASF) was pasted to an end part of the laminated glass of Comparative Example 2 to obtain laminated glass.

Example 13

Example of Interlayer Film in which End Part is Impregnated with Light Stabilizer:

An end part of the laminated glass of Comparative Example 2 was impregnated with a light stabilizer: "Tinuvin765" available from BASF to obtain laminated glass.

Example 14

Example of Interlayer Film in which Sealing Sheet is Used in End Part:

A sealing sheet was pasted to an end part of the laminated glass of Comparative Example 2 to obtain laminated glass. The sealing sheet has high airtightness. The sealing sheet prevents, for example, leakage of an oxidation inhibitor.

(Evaluation)

(1) Preparation of Laminated Glass after Light Irradiation Test

The light irradiation test was conducted using SX-75 available from Suga Test Instruments Co., Ltd. The obtained laminated glass (laminated glass before light irradiation test) was fixed to a sample fixing tool so that one end part of the laminated glass was exposed. From one side of the surface of the fixed laminated glass, xenon light 180 W/m$^2$ with an irradiance of 180 W/m$^2$ (irradiance measuring wavelength 300 to 400 nm) was applied at a black panel temperature of 83° C., a temperature inside the vessel of 50° C. and a humidity of 50% RH for 2000 hours. The laminated glass after light irradiation test was obtained.

(2) Content of Hydroxyl Group and Acetalization Degree

Laminated glass after the light irradiation test obtained in the above (1) was prepared.

A content of the hydroxyl group of polyvinyl acetal resin in the layer (the first layer, or the second and the third layers) of the interlayer film being in contact with the clear glass at a position of 2 mm inwardly in the direction orthogonal to an end side having an end part from the end part of the laminated glass after the light irradiation test was measured. Also, a content of the hydroxyl group of polyvinyl acetal resin in the layer (the first layer, or the second and the third layers) of the interlayer film being in contact with the clear glass at a position of 70 mm inwardly in the direction orthogonal to an end side having an end part from the end part of the laminated glass after the light irradiation test was measured. A ratio (content of hydroxyl group at position of 2 mm/content of hydroxyl group at position of 70 mm) was determined. Also the acetalization degree of the polyvinyl acetal resin was evaluated in the same manner.

(3) Condition of Discoloration in Interlayer Film in End Part of Laminated Glass after Light Irradiation Test Laminated glass after the light irradiation test obtained in the above (1) was prepared.

After the light irradiation test, the end part of the laminated glass was observed, and the condition of discoloration in the end part of the laminated glass was evaluated. The condition of discoloration was judged according to the following criteria.

[Criteria for Condition of Discoloration]

○: No discoloration occurs in interlayer film in end part of laminated glass, or discoloration occurs within length of 1 mm or less inwardly from end part in interlayer film in end part of laminated glass (length in which discoloration occurs is 1 mm or less).

x: Discoloration occurs in length of more than 1 mm inwardly from end part in interlayer film in end part of laminated glass (length in which discoloration occurs is more than 1 mm).

The details and the results are shown in the following Tables 1, 2.

21: First lamination glass member
22: Second lamination glass member
31: Interlayer film
31a: First surface
31b: Second surface
41: Laminated glass

TABLE 1

|  |  | Example 1 | Example 2 | Example 3 | Example 4 | Example 5 | Example 6 | Example 7 | Comparative Example 1 |
|---|---|---|---|---|---|---|---|---|---|
| Configuration of interlayer film | Difference from Comparative Example 1 | Impregnation with alkali liquid | Silica sputtering | Metal sputtering | Use of polyvinyl acetal resin sheet | Use of light stabilizer-containing sheet | Impregnation with light stabilizer | Use of sealing sheet | — |
| Content of hydroxyl group at position of 2 mm (% by mole) |  | 32.0 | 31.0 | 31.0 | 32.0 | 31.0 | 31.0 | 31.0 | 34.0 |
| Content of hydroxyl group at position of 70 mm (% by mole) |  | 30.0 | 30.0 | 30.0 | 30.0 | 30.0 | 30.0 | 30.0 | 30.0 |
| Ratio (content of hydroxyl group at position of 2 mm/ content of hydroxyl group at position of 70 mm) |  | 1.07 | 1.03 | 1.03 | 1.07 | 1.03 | 1.03 | 1.03 | 1.13 |
| Ratio (acetalization degree at position of 2 mm/ acetalization degree at position of 70 mm) |  | 0.971 | 0.986 | 0.986 | 0.971 | 0.986 | 0.986 | 0.986 | 0.942 |
| Condition of discoloration in interlayer film in end part of laminated glass |  | ○ | ○ | ○ | ○ | ○ | ○ | ○ | x |

TABLE 2

|  |  | Example 8 | Example 9 | Example 10 | Example 11 | Example 12 | Example 13 | Example 14 | Comparative Example 2 |
|---|---|---|---|---|---|---|---|---|---|
| Configuration of interlayer film | Difference from Comparative Example 2 | Impregnation with alkali liquid | Silica sputtering | Metal sputtering | Use of polyvinyl acetal resin sheet | Use of light stabilizer-containing sheet | Impregnation with light stabilizer | Use of sealing sheet | — |
| Content of hydroxyl group at position of 2 mm (% by mole) |  | 32.0 | 31.0 | 31.0 | 32.0 | 31.0 | 31.0 | 31.0 | 34.0 |
| Content of hydroxyl group at position of 70 mm (% by mole) |  | 30.0 | 30.0 | 30.0 | 30.0 | 30.0 | 30.0 | 30.0 | 30.0 |
| Ratio (content of hydroxyl group at position of 2 mm/ content of hydroxyl group at position of 70 mm) |  | 1.07 | 1.03 | 1.03 | 1.07 | 1.03 | 1.03 | 1.03 | 1.13 |
| Ratio (acetalization degree at position of 2 mm/ acetalization degree at position of 70 mm) |  | 0.971 | 0.986 | 0.986 | 0.971 | 0.986 | 0.986 | 0.986 | 0.942 |
| Condition of discoloration in interlayer film in end part of laminated glass |  | ○ | ○ | ○ | ○ | ○ | ○ | ○ | x |

EXPLANATION OF SYMBOLS

1: Interlayer film
1a: First surface
1b: Second surface
2: First layer
2a: First surface
2b: Second surface
3: Second layer
3a: Outer surface
4: Third layer
4a: Outer surface
11: Laminated glass

The invention claimed is:

1. A laminated glass comprising a first lamination glass member, a second lamination glass member, and an interlayer film containing a thermoplastic resin, the interlayer film being arranged between the first lamination glass member and the second lamination glass member, wherein, the thermoplastic resin includes a polyvinyl acetal resin, wherein when the laminated glass is subjected to a light irradiation test, no discoloration occurs in the interlayer film irradiated with light in an end part of the laminated glass, or any discoloration that occurs is within a length of 1 mm or less inwardly from the end part of the interlayer film in the end part of the laminated glass, and wherein, when the laminated glass is subjected to the light irradiation test, a ratio of a content of the hydroxyl group of the polyvinyl acetal resin in a layer of the interlayer film in contact with the lamination glass member at a position of 2 mm inwardly from an end part of the laminated glass to a content of the hydroxyl group of the polyvinyl acetal resin in a layer in the interlayer film in contact with the lamination glass member at a position of 70 mm inwardly from an end part of the laminated glass is 1.03 or more and 1.2 or less, the light irradiation test comprising:

irradiating the laminated glass with xenon light at a black panel temperature of 83° C., a temperature inside the vessel of 50° C. and a humidity of 50% RH for 2000 hours, the xenon light being irradiated from the first lamination glass member side when the first lamination glass member and the second lamination glass member have the same visible light transmittance, and the xenon light being irradiated from the side of the lamination glass member having a higher visible light transmittance when the first lamination glass member and the second lamination glass member are different in visible light transmittance, wherein the irradiance at the time of irradiation with xenon light is 180 W/m$^2$, the wavelength for measuring irradiance is 300 to 400 nm, an inner filter is made of quartz, and an outer filter is made of quartz: #275 (cutoff 275 nm).

2. The laminated glass according to claim 1, wherein a content of the hydroxyl group of the polyvinyl acetal resin in the layer of the interlayer film in contact with the lamination glass member at a position of 2 mm inwardly from an end part of the laminated glass after the light irradiation test is 30% by mole or less.

3. The laminated glass according to claim 1, wherein the polyvinyl acetal resin is a polyvinyl butyral resin.

4. The laminated glass according to claim 1, wherein there is a portion in which a lateral surface of the interlayer film is exposed in an end part of the laminated glass.

5. The laminated glass according to claim 1, wherein the interlayer film has a layer having a glass transition temperature of 10° C. or less and containing a thermoplastic resin, or a layer that is colored and contains a thermoplastic resin.

6. The laminated glass according to claim 1, wherein
the interlayer film includes a first layer containing a thermoplastic resin, and a second layer containing a thermoplastic resin, and
the second layer is arranged on a first surface side of the first layer.

7. The laminated glass according to claim 6, wherein the interlayer film includes a third layer containing a thermoplastic resin, and
the third layer is arranged on a second surface side opposite to the first surface side of the first layer.

8. The laminated glass according to claim 1, wherein the interlayer film has a visible light transmittance of 70% or more.

9. The laminated glass according to claim 1, to be used as glass for windshield in an automobile, wherein black coating is not applied on a contact surface between the interlayer film and a lamination glass member on an outer side of the automobile.

10. The laminated glass according to claim 1, to be used as side glass, roof glass or glass for backlight in automobiles.

* * * * *